H. R. Crowe.
Field Roller.

No. 62,822. Patented Mar. 12, 1867.

Witnesses.
F. A. Jackson.
Wm Trewin.

Inventor.
H. R. Crowe.
Per Munn & Co.
Attorneys.

United States Patent Office.

H. R. CROWE, OF CARONDELET, MISSOURI.

Letters Patent No. 62,822, dated March 12, 1867.

---

IMPROVEMENT IN FIELD ROLLER.

---

The Schedule referred to in these Letters Patent and making part of the same.

---

TO ALL WHOM IT MAY CONCERN:

Be it known that I, H. R. CROWE, of Carondelet, in the county of St. Louis, and State of Missouri, have invented a new and useful Improvement in Field Roller; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention consists in pivoting the central section of the roller in front of the two end sections in such a way that it can be removed and used by itself when required; in hinging the frames of the two end sections to each other so that the roller may accommodate itself to the surface of uneven ground, and in suspending the seat from springs attached to the frames of the roller in such a way that the seat may be supported whatever position the rollers may take in passing over uneven ground.

Figure 1:
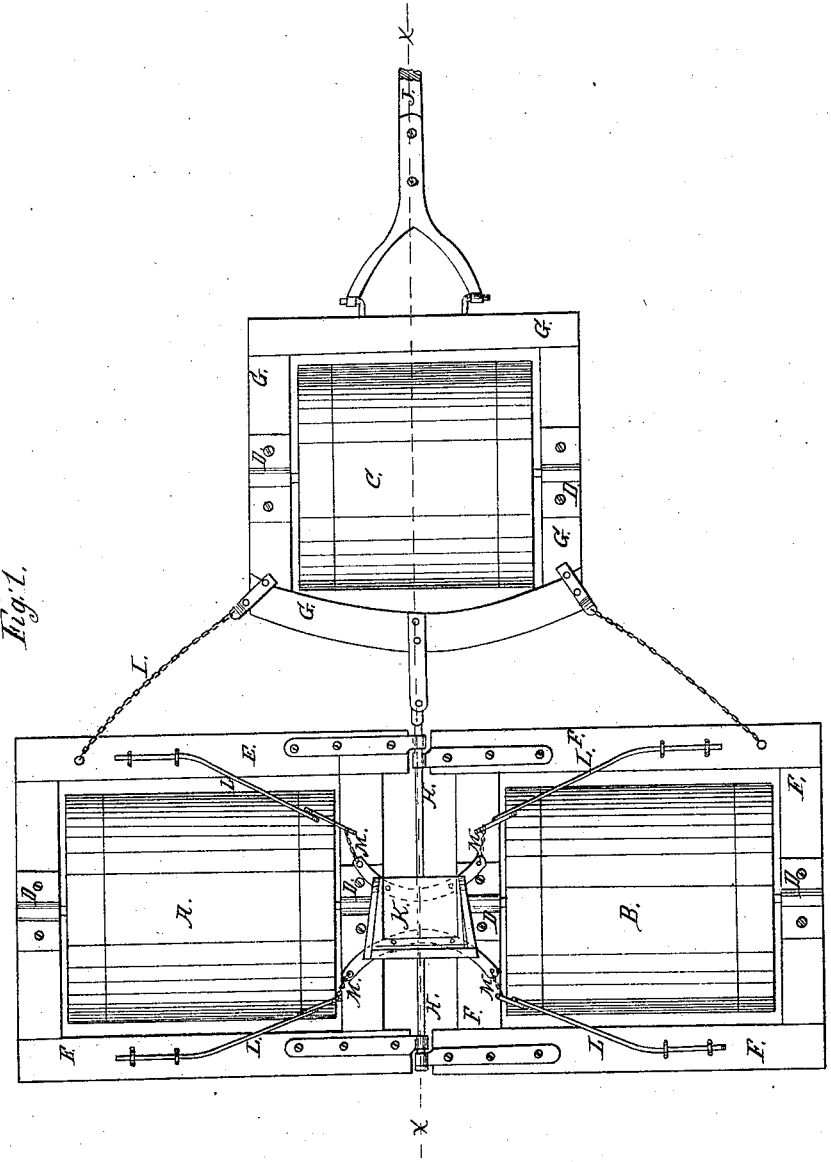
Figure 1 is a top view of my improved field roller.
Figure 2:
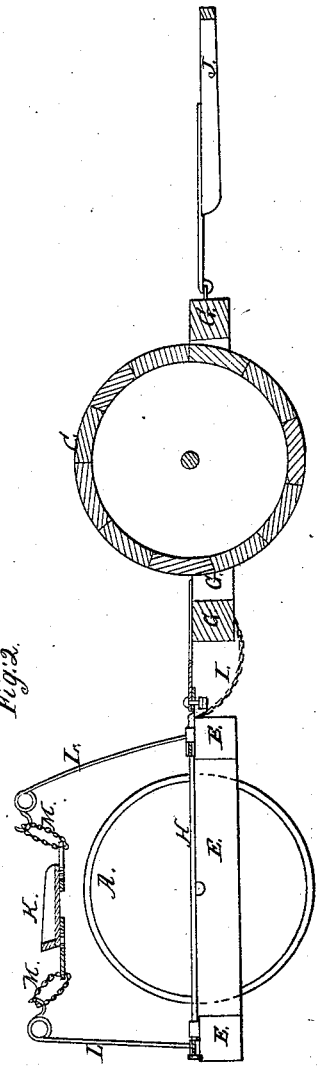
Figure 2 is a vertical longitudinal section of the same taken through the line $x$ $x$, fig. 1.

A and B are the end sections, and C is the central section of the roller. The journals of each of these sections work in bearings D attached to the frames E, F, G, respectively. The frames E and F are hinged to each other, as shown in figs. 1 and 2, so that the sections of the roller may accommodate themselves to the unevenness of the ground being rolled. The rear bar of the frame G is made curved to give the central or forward roller a greater freedom of movement about its pivoting point. The frame G is pivoted to the frames E and F, or to the end of the bar H, to which the said frames are pivoted or hinged. I are chains connecting the frame G to the frames E and F, to limit the movement of the frame G about its pivoting point, and to prevent too great a strain coming upon said pivoting point in turning the roller. This construction enables the roller C and its frame G to be detached from the other parts, and to be used independently when required. When this is done, the tongue J should be removed, and a pair of thills attached in its place so that one horse can draw it. K is a seat, which is suspended by links M or short chains from hooks formed upon the ends of the springs L, the lower ends of which are attached to the frames E, as shown in fig. 1, so that the seat K may retain its place whatever position the rollers A B and frames E F may take in passing over uneven ground.

What I claim as new, and desire to secure by Letters Patent, is—

1. Hinging the frames E and F of the two end sections A and B to each other, substantially as herein shown and described, and for the purpose set forth.

2. Suspending the seat K by means of links M or their equivalent from the springs L, attached to the frames E and F of the roller, substantially as herein shown and described.

H. R. CROWE.

Witnesses:
BERNARD POEPPING,
WILLIAM GRATE,
A. L. BERGFELT.